Aug. 20, 1929. W. NOVACK 1,725,671
SANITARY DOUCHE NOZZLE
Filed May 6, 1927
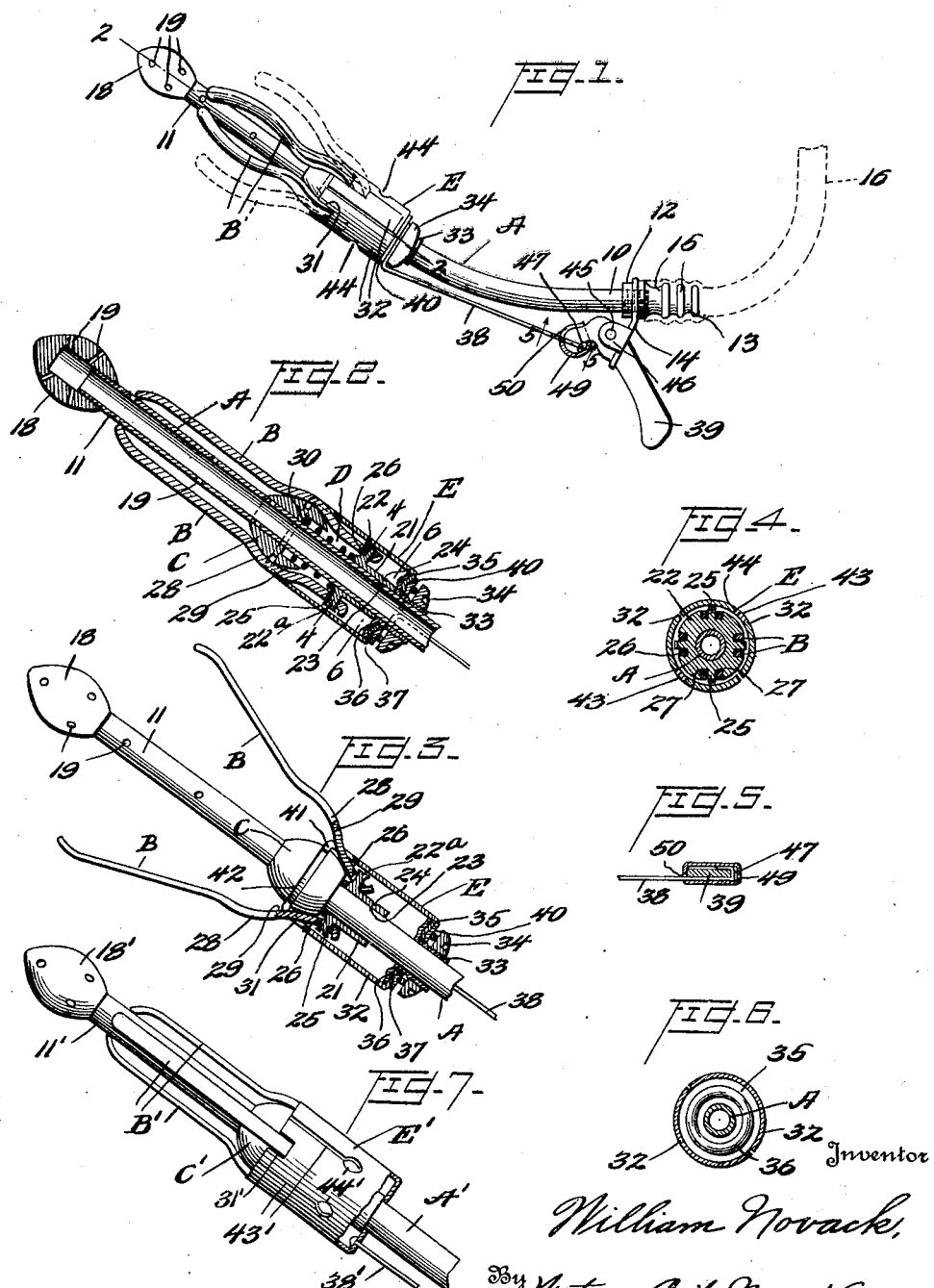

Patented Aug. 20, 1929.

1,725,671

UNITED STATES PATENT OFFICE.

WILLIAM NOVACK, OF BROOKLYN, NEW YORK.

SANITARY DOUCHE NOZZLE.

Application filed May 6, 1927. Serial No. 189,427.

This invention relates to dilating douche nozzles and particularly to dilating nozzles of the expanding arm type.

This invention has among its objects the provision of a douche nozzle which is lighter, less cumbersome, and of less formidable appearance than the usual surgical instruments provided for similar purposes; which carries its operating parts in the smallest possible space so that its appearance conveys the impression that it is harmless and easy to use; which has all moving parts so constructed, arranged and shielded that it actually is harmless and easy to use; which avoids relative movement between the expanding arms and the tissues contacted thereby, which is composed of few and simple parts rendering it inexpensive to manufacture, easy to assemble and take apart, extremely sanitary and accessible for cleaning; which is easy to manipulate; which embodies improved means for pivoting and operating the arms; and which will be highly efficacious in the performance of all of its intended functions.

Various other objects in addition to those mentioned above, and certain features of novelty will be apparent to those skilled in the art from the description taken in connection with the accompanying drawings which, by way of example illustrate two embodiments of this invention, and in which:

Fig. 1 is a side view of the complete assembled nozzle, the normal relative positions of the various parts being shown in full lines and the relative positions of certain of the parts when the arms are expanded being shown in dotted lines;

Fig. 2 is a section on the line 2—2 of Fig. 1 with the parts in normal position;

Fig. 3 is a partial sectional view similar to Fig. 2, but with the arms expanded;

Fig. 4 is a transverse section on the line 4—4 of Figs. 2 and 3 illustrating the improved pivot connection for the arms;

Fig. 5 is a section on the line 5—5 of Fig. 1 illustrating the hand operator connection;

Fig. 6 is a section taken substantially on the line 6—6 of Fig. 2 and

Fig. 7 is a partial longitudinal section of a modification.

Referring particularly to the drawings in which like characters refer to similar parts thruout the several views, A designates a tubular stem bent intermediate its ends to provide a substantially straight proximal end portion 10 and a second substantially straight distal end portion 11. The portion 10 is threaded at its end to take a nut 12 and a nipple 13, between which a bracket 14 is adapted to be clamped. The nipple may be provided with a series of annular ribs 15 to retain the end of a flexible hose 16. The arrangement for securing the bracket and nipple to the stem is described by way of example only, and it is to be understood that any equivalent arrangement may be substituted if desired. The portion 11 of the stem is also preferably threaded to take an ellipsoidal tip 18, both the tip and the stem near its end being provided with holes 19 for the flow of fluid from the stem.

Rigidly secured to the portion 11 of the stem A is a sleeve 21 provided with a flange 22. The sleeve may be made fast to the stem by shrinking thereon or by having nesting pockets 23 punched into corresponding indentations 24 on the stem.

The sleeve 21 is constructed and arranged to act as a pivot member for a plurality of expanding arms B. The arms may be pivotally connected to the sleeve in numerous ways, but according to the present preferred construction the flange 22 is provided with radial studs 25, which fit loosely within apertures 26 in the ends of the arms. The studs may of course extend alone beyond the periphery of the flange but preferably the periphery of the flange extends to the same radial distance as do the studs, the studs being formed simply by cutting pairs of spaced parallel slots 27 in the flange. This produces a rectangular stud of the same thickness as the flange. The apertures 26 are also rectangular but of greater longitudinal extent than the thickness of the studs so as to allow the arms hinged upon the studs to open to the desired limits. The peripheral width of the slots 27 is slightly greater than the width of uncut metal in the arms at either side of the apertures 26 to allow the arms to drop down upon the studs and hinge freely thereon. When the arms are in place upon the studs, the latter which are radially longer than the thickness of the arms have the edges peened over as clearly shown in Fig. 3 to loosely but securely retain the arms in position. A groove $22^a$ may conveniently be formed in the periphery of the flange to facilitate the peening operation.

An ellipsoidal cam C is slidably mounted on the stem A beneath the arms, and adjacent the sleeve 21, there being offset or bent portions 28 on each of the arms to embrace the cam and allow the arms to fold down closely about the stem. The sloping surfaces on the inside of the arms at either side of the crest of the offset portions 28 constitute cam follower surfaces 29 and by moving the ball cam along the stem beneath these surfaces the arms are caused to spread. A compression spring D is arranged between the cam C and the flange 22 to separate them. The cam has an annular socket 30 about the stem to seat one end of the spring and when compressed the spring is almost completely housed in this socket 30.

A short cylindrical shield or shell E encloses the sleeve 21, flange 22, spring D, and the inner ends of the arms B, to protect the user from injury by these parts. This shield is a cup-shaped member apertured at its closed end for a sleeve 33 slidable on the stem. It is provided with notches 31 at its open end to accommodate the arms B and cause them to close. The shield may be made in sections. As clearly shown in Fig. 1 it may consist of two semi-cylindrical portions 32. The halves 32 are firmly held in assembled relation by the flanged sleeve 33 and a nut 34 threaded thereon. The flanged portion 35 of the sleeve 33 is provided with a concentric groove 36 and both flanged ends of the half-shields 32 are provided with mating ribs 37. A wire or rod 38 from an operating lever 39 is adapted to lie in the mating grooves in the half-shields and be clamped between the parts when the nut 34 is screwed up. If desired a corrugated washer 40 may be used between the nut and the shield ends.

The shield at its open end is provided with inturned fingers 41 disposed in an annular groove 42 on the periphery of the cam C. Slits 43 terminating in round ends 44 lend flexibility to the metal adjacent the fingers 41 so they may be snapped into position in the groove. By spreading the arms manually the fingers 41 may also be readily disengaged from the ball and the shield removed for ready access and cleaning of parts. The spaces between the edges of the shield halves have a like function as slits 43 and in effect the complete shield has a slit between each pair of adjacent arms B. These slits not only provide flexibility for the fingers but since they are substantially as long as the shield also permit of a fluid being circulated freely within the shield to keep all parts clean. Thus while in one form of the device the shield has been described as being demountable, such dismemberment is rarely necessary.

As stated above, the operating parts are very compactly arranged and the shield E is unusually short. When the arms are closed the sleeve 33 in the end of shield E is disposed close to and may abut the end of the sleeve 21 and thru the instrumentality of the fingers 41 prevent movement of the cam C beyond the center of the offset portion 28 of the arms. This arrangement is not entirely necessary however, since the action of the shield at the ends of the notches 31 upon the curved portion of the arms can be depended upon to limit the movement of the shield and cam toward the distal end of the stem. When the shield is pulled downwardly, that is toward the right as viewed in Fig. 1 the fingers 41 in the groove 42 of the cam pull the cam beneath the follower portions 29 of the arms B and cause them to spread.

For causing spreading of the arms an operator lever 39 is journaled upon a pin 45 secured in tabs 46 provided on the bracket 14. The connection 38 carries a loop at its end or is bent around the lever 39 in a notch 47 provided thereon and is secured in position by a spring cap 49 provided with a slit 50 to accommodate the projecting portion of the connector. This arrangement is clearly shown in Figs. 1 and 5. Since the tube A is curved, the connector 38 will lie closely adjacent thereto. This not only provides a straight pull for the shield along the axis of the tube on which it slides but also minimizes the danger of the user being cut by the connector due to its reciprocating movements. The divergence of the connector and tube due to the curvature of the tube provides for the convenient mounting of the simple operating lever described or of some other operator of a like nature.

The ends of the arms B terminate a short distance behind the tip 18 and are curved toward the stem so as to have easy entry. The oval shape of the cam C and the inturned disposition of the open end of the shield also contribute to the easy insertion of the instrument. As shown in Fig. 3 and by dotted lines in Fig. 1 the arms have practically the same axial positions with respect to the stem A and bulbous tip 18 when expanded as when closed and from this it will be clear that neither the arms nor the bulbous tip change their positions relative to the tissues of the organ. The arrangement for dilating is not only desirable from a consideration of the simplicity of the structure provided but also from a consideration of the operation of the instrument. If, for example, the fluid being injected from the tip should be found too hot the arms may be immediately collapsed simply by releasing the operating lever to allow removal of the nozzle before injury can be done to the user.

The curvature of the tube A, the short extent of the shield E and the small overall diameter across the tube A and connector 38 between the end of the shield and the operator all contribute toward the desirable feature found in the adaptability of the nozzle to use in any position of the person employing the same. Reference to Fig. 1 will make this clear. Here the instrument is shown in approximately the position it would assume with the operator in a sitting or standing position. The proximal end of the tube A assumes a substantially horizontal position due to its curvature and the fact that the small diameter of the tube between the shield and the operator permits considerable gyratory movement in the organ. This permits the flexible tube 16 to extend upward to the reservoir in a gentle curve from the end of the tube A without pinching shut as it would if the curvature were greater. Thus it will be seen that while most instruments may be successfully employed when the user is prone the present device may be employed when the user is in any position, whether standing, sitting or prone.

In the modified form of the device shown in Fig. 7 the stem A′ is provided with a bulbous tip 18′ as before. The arms B′, their connection to the stem, and their operation by cam C′ are also the same as described. The shield E′, however, in Fig. 7 is formed as one piece instead of being made in segments. There are notches 31′ for the arms B′ and slits 43′, thus giving flexibility to the fingers engaging the cam. In the present case four slits 43′ are required since the shield is made integral and does not have slits between halves. Also the closed end of the shield is made without grooves and ribs and slides in direct contact with the stem since the shield is made as one integral member and no securing devices are needed for sections. The operating connector 38′ is merely inserted thru the end wall of the shield and riveted or otherwise secured in position. The hand operating mechanism and the method of operation are the same as before.

Further embodiments of the invention are contemplated as being within the spirit of the invention and it is to be understood that the invention is not to be limited except by the prior art and the scope of the appended claims.

Having thus described the invention, what is claimed as new and desired to be secured by Letters Patent is:

1. In a dilating douche nozzle, in combination, a tubular stem, a sleeve fixed on said stem, dilator arms pivoted at one end upon said sleeve, a cam slidable upon said stem to expand said arms, a cup-shaped shield slidable on said stem enclosing said sleeve and the pivoted ends of said arms, an annular groove in the closed end portion of said shield, said shield being formed of a plurality of sections, a slidable sleeve extending thru the end of said shield along the stem, a ribbed flange on said sleeve within the shield, means including a flexible connector for causing relative movement of said stem and shield against the action of said spring, and a nut for said slidable sleeve to clamp said flange and said flexible connector against the end portions of said sections to secure the sections rigidly together.

2. In a dilating douche nozzle, in combination, a tubular stem, a sleeve fixed on said stem, dilator arms pivoted at one end upon said sleeves, a cam slidable upon said stem to expand said arms, a cup-shaped shield slidable on said stem enclosing said sleeve and the pivoted ends of said arms, an annular groove in the closed end portion of said shield, said shield being formed of a plurality of sections, means including a ribbed flange mating with the corrugated end portions of said sections to secure said sections rigidly together, and means for causing relative movement of said stem and shield against the action of said spring to operate said dilator arms.

3. In a dilating douche nozzle, in combination, a tubular stem, a sleeve fixed on said stem, dilator arms pivoted at one end upon said sleeve, a cam slidable upon said stem to expand said arms, a shield slidable on said stem enclosing said sleeve and the pivoted ends of said arms, said shield being formed of a plurality of sections, means to secure said sections rigidly together at one end, and means for causing relative movement of said stem and shield against the action of said spring to operate said dilator arms.

4. In a dilating douche nozzle, in combination, a tubular stem, a sleeve fixed on said stem, dilator arms pivoted at one end upon said sleeve, a cam slidable upon said stem beneath said arms to expand them, a spring disposed in operative relation between said cam and sleeve, a shield slidable on said stem enclosing said spring, sleeve and the pivoted ends of said arms, said cam being provided with an annular groove on its periphery, inturned fingers on the end of said shield extending between said arms into the groove for operating said cam, slits in said shield providing flexibility for enabling said fingers to snap into the groove, and means for causing relative movement of said stem and shield against the action of said spring to operate said dilator arms.

5. In a dilating douche nozzle, in combination, a tubular stem, a sleeve fixed on said stem, dilator arms pivoted at one end upon said sleeve, a cam slidable upon said stem beneath said arms to expand them, a spring disposed in operative relation between said cam and sleeve, a shield slidable on said stem enclosing said spring, sleeve and the pivoted ends of said arms, said cam being provided with an annular groove on its periphery, flexible fingers on the end of said shield extending between said arms into the groove for operating said cam, and means for causing relative movement of said stem and shield against the action of said spring to operate said dilator arms.

6. In a dilating douche nozzle, in combination, a tubular stem, a sleeve fixed on said stem, dilator arms pivoted at one end upon said sleeve, a cam slidable upon said stem to expand said arms, a spring disposed in operative relation between said cam and sleeve, a shield slidable on said stem enclosing said spring, sleeve and the pivoted ends of said arms, fingers on said shield disposed in detachable operative engagement with said cam, and means for causing relative movement of said stem and shield against the action of said spring to operate said dilator arms.

7. In a dilating douche nozzle, in combination, a tubular stem, a sleeve fixed on said stem, dilator arms pivoted at one end upon said sleeve, a cam slidable upon said stem to expand said arms, a spring disposed in operative relation between said cam and sleeve, a shield slidable on said stem enclosing said spring, sleeve and the pivoted ends of said arms, flexible fingers on said shield in operative engagement with a circular groove on said cam, and means for causing relative movement of said stem and shield against the action of said spring to operate said dilator arms.

8. In a dilating douche nozzle, in combination, a tubular stem, a sleeve fixed on said stem, dilator arms pivoted at one end upon said sleeve, an ellipsoidal cam slidable upon said stem to expand said arms, said arms engaging a smooth outer surface of said cam, a spring disposed in operative relation between said cam and sleeve, a shield slidable on said stem enclosing said spring, sleeve and the pivoted ends of said arms, operative connections between said shield and cam, and means for causing relative movement of said stem and shield against the action of said spring to operate said dilator arms.

9. In a dilating douche nozzle, in combination, a tubular stem, a cup-shaped shield slidable upon said stem, annular corrugations in the closed end portion of said shield, said shield being formed of a plurality of sector-shaped sections, a sleeve extending thru the closed end of said shield along the stem, a mating corrugated flange on said sleeve within the shield, a mating corrugated washer outside said shield, and a nut threaded on said sleeve for clamping the corrugated end portions of said sections between the flange and washer to secure the segments rigidly together.

10. In a dilating douche nozzle, in combination, a tubular stem, a sleeve on said stem, dilator arms provided with apertures at one end, radial studs on said sleeve loosely extending thru said apertures to provide limited pivotal movement for said arms, and means for expanding said arms.

11. In a dilating douche nozzle in combination, a tubular stem, a sleeve on said stem, dilator arms provided with apertures at one end, a flange on said sleeve, said flange having pairs of parallel spaced slots to provide radial studs loosely extending thru the apertures of said arms to provide limited pivotal movement for said arms, and means for expanding said arms.

12. In a dilating douche nozzle in combination, a tubular stem, a sleeve on said stem, dilator arms provided with apertures at one end, a flange on said sleeve, said flange having pairs of parallel spaced slots to provide radial studs loosely extending thru the apertures of said arms to provide limited pivotal movement for said arms and means for retaining said arms on said studs, and means for expanding said arms.

13. In a dilating douche nozzle in combination, a tubular stem, a sleeve on said stem, dilator arms provided with apertures at one end, a flange on said sleeve, said flange having pairs of spaced parallel slots to provide radial studs loosely extending thru the apertures of said arms to provide limited pivotal movement for said arms and means for expanding said arms, said studs being bradded to prevent removal of said arms.

14. In a dilating douche nozzle in combination, a tubular stem, expanding arms pivoted on said stem, means for operating said arms including a shield slidable along said stem, an operating lever pivotally secured upon said stem in spaced relation to said shield, and a connector disposed in operative relation between said lever and shield.

15. In a dilating douche nozzle in combination, a tubular stem, expanding arms pivoted on said stem, means for operating said arms including a member slidable along said stem, an operating lever pivotally secured upon said stem, said lever including an arm having a rounded end, a notch in said arm, a connector disposed in operative relation between said lever and member and having one end caught in said notch, and a spring cap fitting over the end of said round-ended arm to retain said connector in the notch.

16. In a dilating douche nozzle in combination, a tubular stem, expanding arms pivoted on said stem, means for operating the arms including a member slidable along said stem, an operating lever pivotally secured upon said stem, said lever including an arm having a rounded end, a notch in said arm, a connector disposed in operative relation between said lever and member and having one end caught in said notch, and a slotted cap fitting over the end of said round-ended arm to retain said connector in the notch.

17. In a dilating douche nozzle, in combination, a tubular stem including a straight portion and an end portion slightly bent with respect to the straight portion, normally collapsed expanding arms pivotally mounted on said straight portion, an operating device adjacent the end of the bent portion, and means connecting said device and arms to expand the latter when the device is actuated.

18. The combination set forth in claim 17 but in which said operating device includes a lever pivotally mounted on a bracket secured to said stem.

In testimony whereof I hereunto affix my signature.

WILLIAM NOVACK.